UNITED STATES PATENT OFFICE.

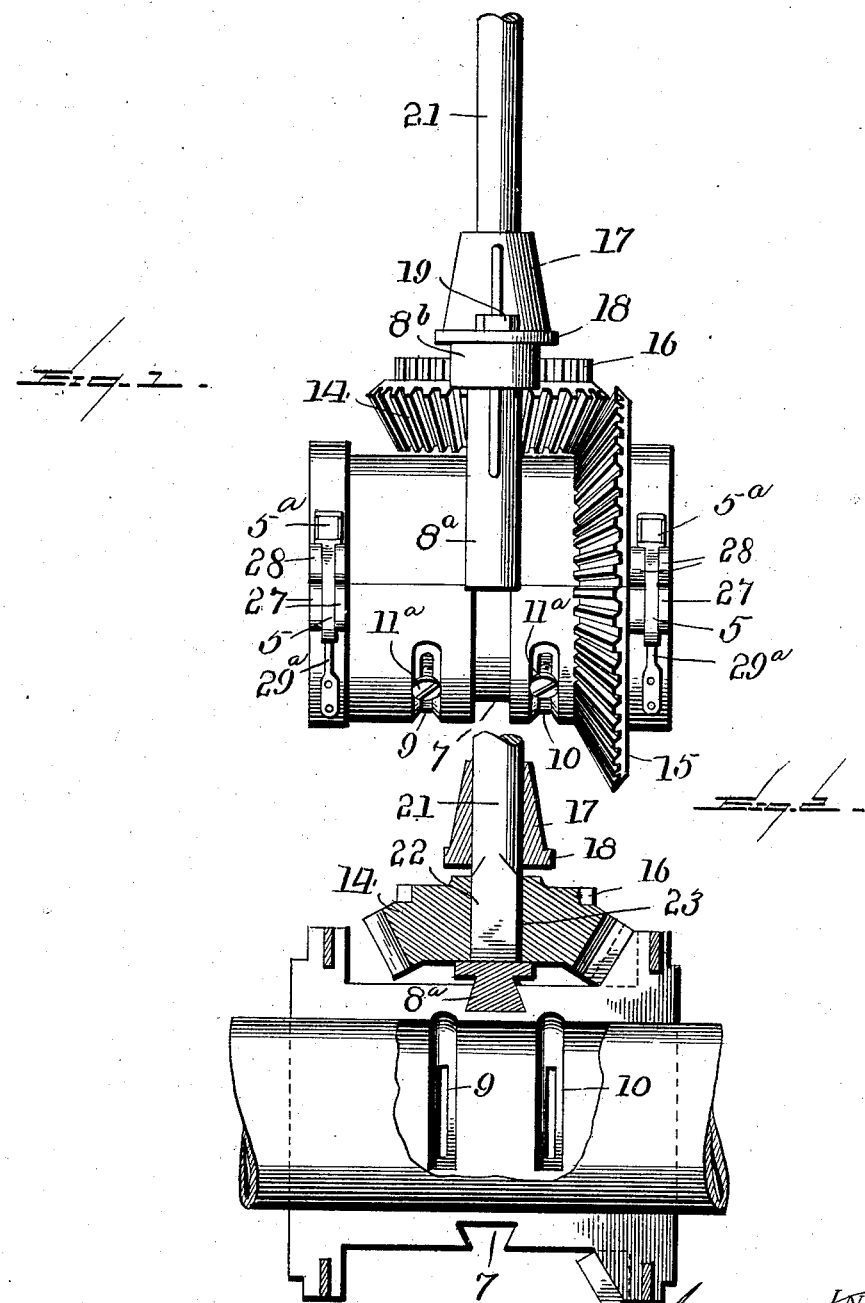

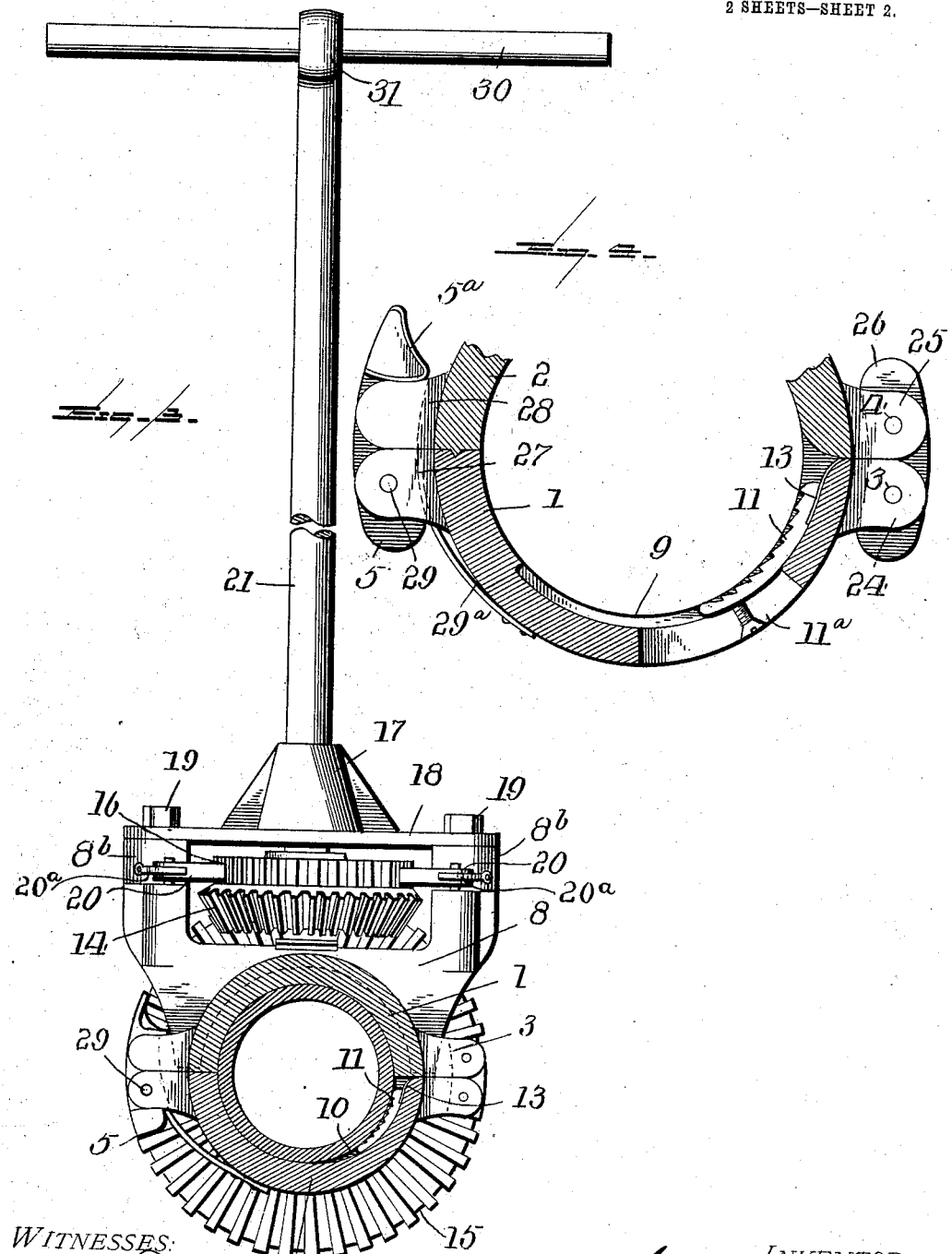

JEREMY BARTLETT, OF COLLINS, NEW YORK.

PIPE-WRENCH.

SPECIFICATION forming part of Letters Patent No. 717,528, dated January 6, 1903.

Application filed December 26, 1899. Serial No. 741,603. (No model.)

*To all whom it may concern:*

Be it known that I, JEREMY BARTLETT, a citizen of the United States, residing at Collins, in the county of Erie and State of New York, have invented certain new and useful Improvements in Pipe-Wrenches; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to pipe-wrenches, and is adapted particularly for use where pipes of large diameter are employed—for instance, those serving as underground conduits.

The object of the invention is to provide a pipe-tool of the above-mentioned class which is positive in operation, readily engaged and disengaged with the pipe with which it may be employed, and which is so constructed and arranged as to permit its manipulation upon the pipe without the necessity of the manipulator entering the trench in which the work may be in progress, and which in many instances is narrow.

The invention consists, essentially, in a bisected sleeve or cylinder constructed and arranged to be readily secured about a pipe, engaging dogs mounted within the bisected sleeve and arranged for intermittent engagement with the pipe in one direction as the bisected sleeve is given an oscillatory motion, and means for rotating the cylinder, the wrench being manipulated by a shaft or handle, gears, and other adjunctive parts.

The invention will be more fully set forth hereinafter, reference being had to the accompanying drawings, in which—

Figure 1 is a side elevation of the invention with the manipulating shaft or rod broken away. Fig. 2 is a central longitudinal section of the improvement. Fig. 3 is a transverse section at one side of the yoke, and Fig. 4 is an enlarged detail view illustrating the arrangement of the engaging jaws and manner of engaging and disengaging the bisected cylinder.

Referring now to the drawings, the numerals 1 and 2 designate semicylindrical parts hinged together at one side, as at 3 and 4, and provided on their opposite sides with a spring-pressed or other engaging dog 5, whereby said parts may be formed into a complete cylinder or sleeve, and which will be described more fully hereinafter. Centrally disposed of the ends of the cylinder thus formed and formed in the exterior thereof is a dovetailed groove 7, adapted to receive the semicircular dovetailed base 8ᵃ of the yoke 8, as clearly illustrated in dotted lines in Fig. 3 of the drawings. This base 8ᵃ of the yoke is fitted in the groove 7 when the semicylindrical parts are open, and it will be readily understood that when the cylindrical parts are closed to form a complete sleeve or cylinder the yoke will consequently be slidably locked thereabout.

On the inner surface of the semicylindrical part 1 are formed tapering grooves 9 and 10, and when the cylindrical parts 1 and 2 are assembled it will be seen that these grooves 9 and 10 are arranged one upon each side and parallel with the plane of the exterior groove 7, and further arranged to lie substantially concentric with the assembled cylindrical parts. Slidably movable and removably fitted within the grooves 9 and 10 are disposed segmental pipe-engaging jaws 11, which when the pipe is turned in one direction are adapted to slide toward the tapering ends of the grooves, which permits the toothed edges thereof to protrude slightly above the inner surface of the cylinder and grip or engage the exterior of the pipe being operated upon, whereby slipping of the pipe is obviated during movement in one direction. When the wrench is then turned in the opposite direction, these jaws 11 slide back into place, where they are held under tension by the spring 13.

Disposed within the yoke 8 is a beveled pinion 14, which is adapted to engage the beveled gear 15, formed at one end of the separable cylinder and disposed at right angles thereto, the said beveled gear being split or bisected to correspond with the sections of the cylindrical parts 1 and 2. Immediately above the pinion 14 and formed integral therewith is disposed a ratchet-wheel 16. Arranged above the ratchet-wheel 16 is a sleeve 17, having a base 18 extending outwardly and secured by means of the bolts 19 or their equivalents to the uprights 8ᵇ of the yoke 8. Disposed directly opposite the ratchet-wheel 16 and on each side thereof are mounted spring-pressed pawls 20 for a purpose hereinafter explained, said springs beings designated by the reference characters 20ᵃ.

The reference character 21 designates a shaft, bar, or the like and has a rectangular-shaped lower end 22, which is inserted into the rectangular opening 23 of the pinion 14 and the ratchet-wheel 16, said shaft or its equivalent passing through the sleeve 17.

As illustrated in Fig. 4, the semicylindrical parts 1 and 2 are hinged together by the radially-projecting lugs 24 and 25, being connected by means of the pivot-pins 3 and 4 to the bar 26. These lugs 24 and 25 are arranged one pair on each and the same side of each section of the separable cylinder, and disposed directly opposite them on the other side of the cylinder and arranged in the same manner are disposed other lugs 27 and 28. Pivoted by means of the pivot-pin 29 is a dog or other member 5, having a flanged head 5ᵃ, adapted to engage and clamp over the lugs 28, a spring 29ᵃ contacting with said member 5 to normally hold the free end thereof in clamped or locked position, thereby holding the cylindrical parts against accidental unfastening during work upon a pipe.

If it be desired to give a continuous rotary motion to the cylinder, one of the pawls 20 is disengaged from the ratchet-wheel 16, and a cross-bar 30 is fitted into the eye 31, arranged at the upper and free end of the shaft or bar 21, and by turning the shaft or bar 21 with the cross-bar 30 the pinion 14, which engages the beveled gear 15, may be turned in a continuous direction, carrying said gear and assembled cylinder therewith.

The operation of my improved wrench is as follows: The segmental jaws 11 are placed within the grooves 9 and 10, the base 8ᵃ of the yoke 8 fitted into the groove 7, and the cylindrical parts 1 and 2 are then clasped or otherwise secured around the pipe. The manipulating-shaft 21 or its equivalent has its lower end 22 fitted into the opening 23 of the pinion and ratchet-wheel, first passing through the sleeve 18. Should it be desired to give an intermittent rotary motion to the pipe, the pinion 14 is locked into engagement with the beveled gear 15 by one of the spring-pressed pawls 20, which prevents turning of the wrench in one direction. It will be readily seen that an oscillatory motion given to the shaft 21 or its equivalent will also give such a movement to the assembled cylinder, and, further, that the engaging jaws 11, by reason of their position in the wedge-shaped grooves 9 and 10, will be caused to engage the pipe as the cylinder is turned in one direction and will disengage the pipe on the return stroke, for the reason that the jaws are permitted to slide into the larger ends of the said grooves.

It is evident from the foregoing that a continuous rotary movement can be given the wrench, and at this time I might state that both pawls 20 are engaged with the ratchet-wheel 16 to lock the yoke when the pipe is being taken from the wrench.

I wish it understood that in practice various modifications of the specific construction shown may be made including the substitution of any mechanical equivalent for the gears illustrated and described and that any suitable materials and proportions may be resorted to without departing from the spirit of the invention.

What I claim is—

1. A device of the class described comprising a separable cylinder having engaging jaws slidably mounted therein, said cylinder having a section of a gear disposed upon one end of each separable part thereof, a yoke having a curved base for engagement with the cylinder, and means for holding the cylinder against rotation in one direction.

2. A device of the class described comprising a separable cylinder having pipe-engaging jaws mounted therein, said cylinder having a concentric gear, a yoke engaged with the cylinder and including a shaft, a pinion disposed upon the shaft and engaging the gear, a ratchet-wheel carried by the pinion, and pawls upon the yoke in operative relation to the ratchet-wheel for holding it against rotation in one direction.

3. A device of the class described comprising a separable cylinder having grooves arranged in one section thereof, engaging jaws mounted in said grooves, a concentrically-arranged gear mounted upon one end of the cylinder, another groove formed in the exterior of the cylinder, a yoke engaged with the last-mentioned groove, said yoke including a shaft, a pinion disposed upon the shaft and engaging the gear, a ratchet-wheel carried by the pinion and pawls disposed upon the yoke in operative relation to the ratchet-wheel for holding it against rotation in one direction.

4. A device of the class described comprising a separable cylinder having pipe-engaging jaws mounted therein, means for fastening the cylinder when assembled, said cylinder having a concentric gear, a yoke engaged with the cylinder and including a shaft, a pinion disposed upon the shaft and engaging the gear, a ratchet-wheel carried by the pinion, and pawls upon the yoke in operative relation with the ratchet-wheel for holding it against rotation in one direction.

5. A device of the class described comprising a separable cylinder hinged upon one side, and provided with a pivoted locking member upon its opposite side, grooves arranged in one section of the cylinder, pipe-engaging jaws mounted in said grooves, a dovetailed groove formed in the exterior of the cylinder, a yoke having a semicircular dovetailed base for engagement with the said dovetailed groove, a shaft, a concentrically-arranged gear mounted upon one end of the cylinder, a pinion disposed upon the shaft and engaging the gear, a ratchet-wheel formed integral with and disposed upon the pinion, a sleeve surrounding the shaft and secured to the yoke, and pawls disposed upon the yoke in operative relation to the ratchet-wheel for holding it against rotation in one direction.

6. A device of the class described comprising a separable cylinder having pipe-engaging jaws mounted therein, said cylinder being hinged upon one side, and provided upon its opposite side and on one section thereof with lugs, and upon the other section and on the same side with the said lugs with pivoted locking members having flanged heads for engagement with the lugs, a concentrically-arranged gear mounted upon one end of the cylinder, a groove formed in the exterior of the said cylinder, a yoke engaged with the said groove and including a shaft, a pinion disposed upon the shaft and engaging the gear, a ratchet-wheel carried by the pinion, and pawls upon the yoke in operative relation with the ratchet-wheel for holding it against rotation in one direction.

7. In a device of the class described the combination with a separable cylinder hinged upon one side and provided with locking members upon its opposite side, of pipe-engaging jaws slidably mounted within the cylinder, a groove formed in the exterior of the cylinder, a yoke engaging the said groove, a concentrically-arranged gear disposed at one end of the cylinder, and means connected with the yoke and in communication with the gear for rotating the cylinder.

8. In a device of the class described the combination with a separable cylinder hinged upon one side and provided with spring-pressed locking members upon its opposite side, pipe-engaging jaws mounted within the cylinder, a groove formed in the exterior of the cylinder, a yoke engaging the said groove, a concentrically-arranged gear disposed upon one end of the cylinder, and means connected with the yoke and in communication with the gear for oscillating the cylinder.

9. In a device of the class described the combination with a separable cylinder hinged upon one side and provided with pivoted locking members upon its opposite side, of pipe-engaging jaws mounted within the cylinder, a dovetailed groove formed in the exterior of the cylinder, a yoke having a semicircular dovetailed base for engagement with said groove, a concentrically-arranged gear disposed upon one end of the cylinder, and means connected with the yoke and in communication with the gear for oscillating the cylinder.

10. A device of the class described comprising a separable cylinder having pipe-engaging jaws mounted therein, a dovetailed groove formed in the exterior of the cylinder, a yoke having a semicircular dovetailed base for engagement with the dovetailed groove, and means for oscillating the cylinder.

11. A device of the class described comprising a separable cylinder having pipe-engaging jaws slidably mounted therein, means for fastening the cylinder when assembled, a groove formed in the exterior of the cylinder, a yoke adapted to engage the said groove, a gear mounted upon the cylinder, and means for oscillating the latter.

12. A device of the class described comprising a separable cylinder having pipe-engaging jaws mounted therein, means for fastening the cylinder when assembled, a dovetailed groove formed in the exterior of the cylinder, a yoke adapted to engage and slide within the said groove, a gear mounted upon the cylinder, means for oscillating the cylinder and means for rotating the same.

13. A device of the class described comprising a cylinder having pipe-engaging jaws slidably mounted therein, means for placing tension upon the said jaws, means for fastening the cylinder when assembled, and means for oscillating the cylinder.

14. A device of the class described comprising a yoke including a shaft, and a concaved base.

15. A device of the class described comprising a yoke including a shaft, and a concaved, dovetailed base.

16. A device of the class described comprising a cylinder having pipe-engaging jaws slidably mounted therein, means for placing the said jaws under tension, means for fastening the cylinder when assembled, means for oscillating the cylinder, and means for rotating the same.

17. A device of the class described comprising a separable cylinder having grooves arranged in one section thereof, a pipe-engaging jaw mounted in each of said grooves, means for placing each of said jaws under tension, means for fastening the cylinder when assembled, means for oscillating the cylinder, and means for rotating the same.

18. A device of the class described comprising a separable cylinder having tapering grooves arranged in one section of the cylinder and in a parallel plane with each other, a tapering pipe-engaging jaw mounted in each of said grooves, means for fastening the cylinder when assembled, means for oscillating the cylinder, and means for rotating the same.

19. A device of the class described comprising a separable cylinder having tapering grooves arranged in one section thereof and parallel to each other, a tapering pipe-engaging jaw mounted in each of the said grooves, means for placing each of said jaws under tension, means for fastening the cylinder when assembled, and means for rotating the cylinder.

20. A device of the class described comprising a cylinder having an interior tapering groove, a tapering pipe-engaging jaw mounted in said groove, means for oscillating the cylinder, and means for rotating the same.

21. A device of the class described comprising a separable cylinder having an interior tapering groove therein, a tapering pipe-engaging jaw mounted in said groove, a dovetailed groove formed in the exterior of the cylinder, a yoke adapted for engagement with the said dovetailed groove, means for fastening the cylinder when assembled, the aforesaid yoke including a shaft, a pinion disposed upon the shaft, a gear disposed upon the cylinder and in communication with the said pinion, a ratchet-wheel formed integral with and carried by the pinion, means for oscillating the cylinder, and means for rotating the cylinder.

22. A device of the class described comprising a cylinder having an interior tapering groove, a tapering pipe-engaging jaw slidably mounted in said groove, means for placing the said jaw under tension, means for oscillating the cylinder, and means for rotating the same.

In testimony whereof I have signed my name to this specification in the presence of two subscribing witnesses.

JEREMY BARTLETT.

Witnesses:
O. E. HODDICK,
DANIEL McINTOSH.